(12) United States Patent
Garcia Maestre et al.

(10) Patent No.: US 9,175,492 B2
(45) Date of Patent: Nov. 3, 2015

(54) WIND GENERATOR TOWER AND PROCESS FOR ASSEMBLY THEREOF

(75) Inventors: Ivan Garcia Maestre, Sarriguren (ES); Eduardo Azanza Ladron, Sarriguren (ES); Jose Miguel Garcia Sayes, Sarriguren (ES); Miguel Nunez Polo, Sarriguren (ES)

(73) Assignee: Acciona Windpower, S.A., Sarriguren (ES)

( * ) Notice: Subject to any disclaimer, the term of this patent is extended or adjusted under 35 U.S.C. 154(b) by 0 days.

(21) Appl. No.: 13/043,426

(22) Filed: Mar. 8, 2011

(65) Prior Publication Data

US 2011/0239563 A1    Oct. 6, 2011

(30) Foreign Application Priority Data

Mar. 8, 2010   (ES) .................... 201030336

(51) Int. Cl.
*E04C 5/08*   (2006.01)
*E04H 12/12*  (2006.01)
*E04B 1/16*   (2006.01)

(52) U.S. Cl.
CPC ............... *E04H 12/12* (2013.01); *Y02E 10/728* (2013.01)

(58) Field of Classification Search
CPC ............................. E04H 12/12; Y02E 10/728
USPC ......... 52/223.3, 223.4, 223.5, 223.14; 264/35
See application file for complete search history.

(56) References Cited

U.S. PATENT DOCUMENTS

| | | | | |
|---|---|---|---|---|
| 774,441 A * | 11/1904 | Luck | ................... | 256/50 |
| 1,143,954 A * | 6/1915 | Hague | ................... | 138/161 |
| 1,206,484 A * | 11/1916 | Swan | ................... | 52/223.3 |
| 1,258,839 A * | 3/1918 | Wheeler | ................... | 52/20 |
| 1,394,997 A * | 10/1921 | Lake | ................... | 264/317 |
| 2,331,311 A * | 10/1943 | Davis | ................... | 264/31 |
| 3,300,942 A * | 1/1967 | Horstman | ................... | 52/745.09 |
| 3,688,461 A * | 9/1972 | Rensch et al. | ................... | 52/653.1 |
| 4,092,811 A * | 6/1978 | Lin et al. | ................... | 52/223.3 |
| 4,124,960 A * | 11/1978 | Bush et al. | ................... | 52/245 |
| 4,205,949 A * | 6/1980 | Hanson | ................... | 425/59 |
| 4,232,495 A * | 11/1980 | Lin et al. | ................... | 52/223.3 |
| 4,320,076 A * | 3/1982 | Greenwood | ................... | 264/35 |
| 4,799,307 A * | 1/1989 | Reigstad et al. | ................... | 29/452 |
| 5,032,197 A * | 7/1991 | Trimble | ................... | 156/71 |
| 5,072,555 A | 12/1991 | Geiger | | |
| 5,114,634 A * | 5/1992 | McMillan et al. | ................... | 264/28 |
| 5,511,762 A * | 4/1996 | Connors et al. | ................... | 249/115 |
| 7,160,085 B2 * | 1/2007 | de Roest | ................... | 416/244 R |
| 7,739,843 B2 * | 6/2010 | Cortina-Cordero | ................... | 52/223.5 |
| 7,770,343 B2 * | 8/2010 | Montaner Fraguet et al. | ................... | 52/223.5 |
| 7,789,586 B2 * | 9/2010 | Ess | ................... | 404/25 |
| 8,051,609 B2 * | 11/2011 | Olgaard | ................... | 52/30 |

(Continued)

FOREIGN PATENT DOCUMENTS

| | | |
|---|---|---|
| EP | 1474579 | 11/2004 |
| EP | 1561883 | 8/2005 |

(Continued)

*Primary Examiner* — Charles A Fox
*Assistant Examiner* — Joseph J Sadlon
(74) *Attorney, Agent, or Firm* — Hayes Soloway PC

(57) ABSTRACT

The present invention provides a wind generator tower and a process for assembly thereof. A truncated conical tower assembled from reinforced concrete modules disposes of a tensioning system which provides greater resistance to the same and, in turn, the joints defined between the modules which form the tower are sealed.

20 Claims, 4 Drawing Sheets

(56) References Cited

U.S. PATENT DOCUMENTS

| | | | |
|---|---|---|---|
| 8,458,970 B2 * | 6/2013 | Zavitz et al. | 52/223.5 |
| 2003/0071468 A1 * | 4/2003 | Platt | 290/55 |
| 2004/0052589 A1 * | 3/2004 | Lewis | 405/284 |
| 2008/0209842 A1 * | 9/2008 | Montaner Fraguet et al. | 52/651.07 |
| 2009/0145073 A1 * | 6/2009 | Takeshima et al. | 52/653.1 |
| 2011/0239563 A1 * | 10/2011 | Garcia Maestre et al. | 52/223.5 |

FOREIGN PATENT DOCUMENTS

| | | |
|---|---|---|
| WO | 86/02689 | 5/1986 |
| WO | 2009/056969 | 5/2009 |

* cited by examiner

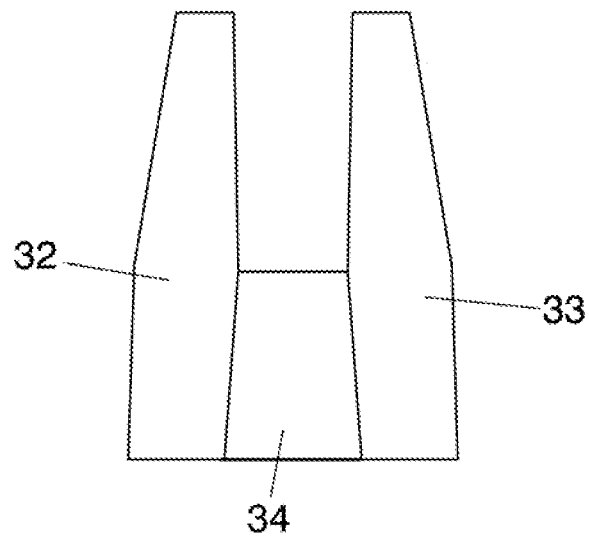
FIG. 3
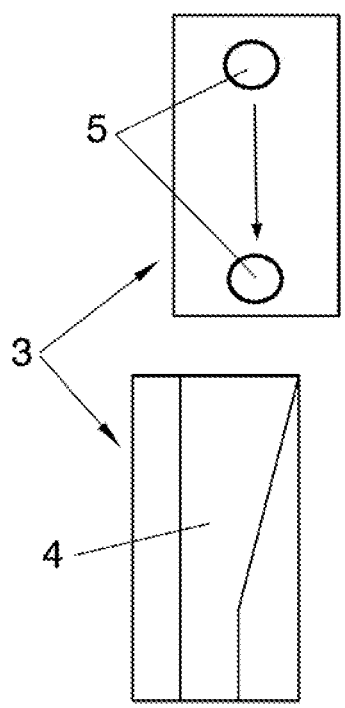 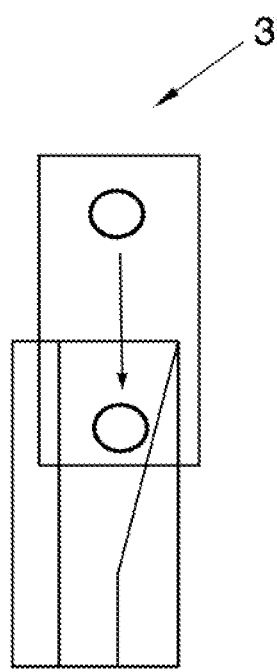 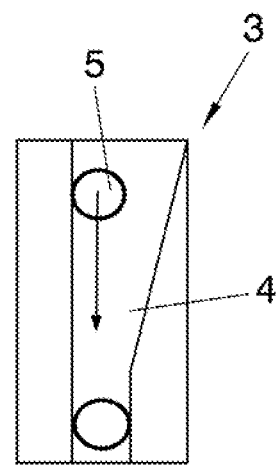
FIG. 4A  FIG. 4B  FIG. 4C

WIND GENERATOR TOWER AND PROCESS FOR ASSEMBLY THEREOF

CROSS REFERENCE TO RELATED APPLICATION

This application claims the benefit of Spanish Patent Application No. P201030336, filed Mar. 8, 2010, which is hereby incorporated by reference herein in its entirety.

FIELD OF THE INVENTION

The present invention relates to the field of reinforced concrete structures and, more specifically, to reinforced concrete towers. More particularly, the present invention comprises a reinforced concrete tower for wind turbines together with corresponding tensioning means and union with joints and a process for assembly thereof.

BACKGROUND OF THE INVENTION

Renewable energy is an option to take very much into account nowadays. Among them, one of the most efficient is wind power, which allows electricity to be obtained from the wind using windmills or wind turbines. Said wind turbines are generally formed of a tower, a gondola, a rotor and some arms; where the wind turbine tower supports the gondola and the rotor. For large wind turbines, the tubular towers can be made of steel, lattice truss or reinforced concrete. Tubular towers tensioned with wind are only used with small wind turbines (battery chargers, etc.).

Different types of towers exist, such as modular towers, as described in European Patent No. ES2272954T3 in the name of Mecal Applied Mechanics B.V., where a modular tower is disclosed consisting of dividing the tower into different annular sections, each annular section being constructed so as to put various modules together with others, stacking the annular constructed sections one on top of the other.

In Spanish Utility Model No. ES1058539U in the name of Inneo21, S.L., a modular tower is also disclosed resulting from the approach to divide the tower into annular sections with each section constructed with various modules put together.

Likewise, in European Patent No. EP1561883B1 in the name of Corus Staal BV, a metallic modular tower is disclosed composed of metallic sections that are substantially quadrangular and placed in a stepped position.

International Publication No. WO 2009/056969 discloses an assembly system of a reinforced concrete tower consisting of assembling an inner metallic structure that has the function of supporting the segments to be fastened to, once raised one by one into position, until the vertical joints are produced.

In said wind turbine towers, sometimes it may be necessary to use damp joints between the elements of prefabricated reinforced concrete, which consist of pouring or injecting mortar or grout into a slot in the sides of the prefabricated elements. Spanish Utility Model No. ES1060629U in the name of Inneo21, S.L., for example, discloses joints of this type.

Generally speaking, reinforced concrete operates better under compression than under traction. As such, it is common to incorporate tensioning cables, which subject the reinforced concrete structure to compression, as it can be possible with a tower structure for wind turbines made of reinforced concrete. Disclosed in the state of the art are cables in the interior of the reinforced concrete modules, as in International patent application WO 86/02689A1, or outside the interior surface of the tower, as in French Patent No. FR508598A. Passing the cables through the interior of the modules is a task which complicates the assembly of the towers, while to pass them over the interior surface of the tower presents the problem of interference of the cables with the many elements that compose a wind turbine tower (e.g., platforms, stairs, lifts, electric equipment and accessories, etc.) and lower effectiveness: with the same tension in the cables a lower moment of compression is achieved, which entails the need to use a greater number of cables.

On the other hand, in patents such as U.S. Pat. No. 5,072,555, tensioning systems are disclosed on the exterior of a tower which are fixed to the ground at a distance from the base of said tower; the cables placed as such modify the dynamic behavior of the structure, modifying the oscillation frequency and limiting its movement.

As disclosed above, dividing a section of truncated conical tower into equal modules, such as reinforced concrete modules, has the disadvantage that the space between the two modules is narrower at the upper part than the part which is supported on the module below; as a result, it is not possible to insert the following module following a totally or partially vertical trajectory. For example, in European Patent No. ES2272954T3, a tower is disclosed which has a cross section which is a polygon or a circle, whose diameter decreases towards the upper part, so that a conical finished shape is achieved or approached. The only way of inserting the new module is by following a trajectory with a horizontal component, which complicates the assembly considerably. In European Patent No. ES2272954T3, reference is made to the disadvantages associated with the manufacture of a conical tower, overcome with the implementation of the object of this invention.

Similar disadvantages are found with a tower with stepped modules where the tower has a circular cross section, with one or more rings of the tower being stepped so that the exterior diameter and/or the thickness of the wall of an upper ring is less than the respective lower ring, making the vertical assembly of the following module impossible.

SUMMARY OF THE INVENTION

The modular tower object of the present invention comprises a truncated conical shaped tower composed of various tubular sections, constructed by joining modules one to the other, said modules are concrete modules with metallic casing, reinforced concrete.

The tower object of the present invention presents at least two embodiments: a first embodiment through the use of tubular sections or modules, which have two lateral sides in which longitudinal inclusions are found, an upper side and a lower side which are formed using modules which are joined one to the other to form the tower, and a second embodiment or alternative embodiment of a stepped design which makes use of polygonal modules. In both embodiments, at least one part of the lateral sides between the adjacent modules to a first module are parallel, having the space between the two modules their facing sides parallel, such that the intermediate module can be inserted with a vertical movement.

In said alternative embodiment which has a stepped design, the modules are six-sided polygons, with a shape such that, as described in the previous paragraph, the upper part of the lateral sides between the adjacent modules to a first module are parallel, making the vertical insertion of the first module possible.

In both embodiments, the modules incorporate guiding means which define the insertion movement of a module between those adjacent to it. In one possible embodiment, a guide is incorporated in the adjacent modules and the piece to be inserted has some projections which enter in the guides (or vice versa, the guide is in the modules to be inserted and the projections in the adjacent pieces). The entrance of said projections in the guides can have a wedge shape to facilitate insertion, hence facilitating the assembly.

Once the guides are inserted, the modules are held in place without the need for additional tools it being possible to subsequently set the definitive vertical joint. The assembly can be carried out by raising module onto module and, as opposed to that known in the state of the art, it is not necessary to incorporate additional means to fasten each module until setting the joints.

Likewise the system of the present invention in any of the possible embodiments disposes of tensioning means, for which tensioning cables are available which run along the exterior of the external face of the tower. In contrast to these solutions for the state of the art, the assembly is simple and does not interfere with the components within the interior of the tower and the effectiveness of the tensioning of the cables to achieve the moment of compression is maximum. All of this without modifying the structural dynamic substantially.

The tensioning cable or cables are fixed to the wall of the tower at intermediate points using anchors and, in turn, are held at the ends to the mast-interface, situated at the top of the tower and the foundation, while the gondola is attached directly to said mast, or even the mast is attached to some metallic sections of the tower to define a mixed tower. In one possible embodiment of the present invention, the reinforced concrete modules have slots in their external surface to house the cables. In another embodiment of the present invention, the tensioning cables can run along at least a part of the foundation, hence subjecting the tower to compression, as well as all the horizontal joints and the foundation.

It should be noted, however, that the tensioning system described can also be carried out and applied to any other type of reinforced concrete tower, both any kind of modular type or those constructed pouring the concrete in-situ, exploiting in this way the advantages which are offered not only in the construction of wind turbine towers but in any type of reinforced concrete structure be it conical, truncated conical, cylindrical or any other type of tower.

In a preferred embodiment, the vertical and/or horizontal joints are damp, being executed by pouring or injecting mortar or grout. The temperature conditions both the handling of the mortar and the resistance achieved once hardened, however it is common to have wind turbines in extreme climates which makes it difficult to keep the mortar or grout at the optimal temperature. As such, in one embodiment, thermal conditioning of the filler is envisaged before being poured. In this way, when the assembly of the tower is carried out at an extreme ambient temperature, be it extreme cold or heat, the temperature of the mortar or grout is conditioned so that there is a thermal gradient with respect to the temperature of the reinforced concrete module. The optimal temperature is commonly comprised between 15° C. and 25° C. As such, for example, for an optimal temperature of 20° C., when the ambient temperature is 40° C. the mortar or grout is cooled to 5° C., so that once the joint is filled it reaches the optimal temperature. On the other hand, if the temperature is −5° C., the mortar or grout is heated, for example, to 35° C. so that the hardening begins at a temperature close to the optimal temperature.

In another embodiment, the tower object of the present invention can dispose of elastic elements on the lateral sides of the modules, so that once a module is inserted between two other modules, the elastic element seals the space between the modules. The guide system of the present invention allows the insertion of a module to be carried out without damaging the aforementioned elastic elements of the sides, making it unnecessary, thanks to said elastic elements, the positioning of shuttering during the execution of a damp vertical joint. Said elastic elements can come in the form of tubes which expand using the backfilling with a fluid, such as air, guaranteeing as such correct sealing of the joint when swelled.

In another embodiment of the tower object of the present invention, the casing of the reinforced concrete modules is extended until it is introduced in the slot of the vertical joint of the adjacent module, providing as such the continuity of the casing to the reinforced concrete modules between two adjoining modules.

In another embodiment, the concrete tower composed of various tubular sections constructed by joining modules or segments one to the other is such that the vertical joint between the segments also comprises of bolts which cross the lateral side of a module and thread onto the lateral side of an adjoining module, hence ensuring the attachment or anchorage between modules. In this way the structural responsibility of the join does not fall solely on the joint filled with mortar or grout but also on the bolts.

Said anchorage using bolts is done in a first step, hence consolidating the join between modules and in a subsequent step the joint is filled with mortar or grout.

The joins using bolts or screws have the disadvantage of needing maintenance. In one embodiment the bolt, in the stretch in which it runs through the joint has a part with a section that is not round, for example polygonal. Once the filling has been poured and has hardened in the joint, said section blocks the bolt, making it impossible to turn it and hence obtaining a join that does not need maintenance.

BRIEF DESCRIPTION OF THE FIGURES

Various objects, features and advantages of the present invention can be more fully appreciated with reference to the following detailed description when considered in connection with the following drawings, in which like reference numerals identify like elements.

FIG. 3 shows a section of the tower object with a stepped design in accordance with some embodiments of the present invention.

FIGS. 4A, 4B, and 4C show some sections of the components of the guiding means and their relative position to each other in a sequential way.

DETAILED DESCRIPTION OF THE INVENTION

Shown in the figures disclosed below is a form of preferred embodiment of a tower (1, 2) and the assembly of the same object of this invention.

Figure 1A:
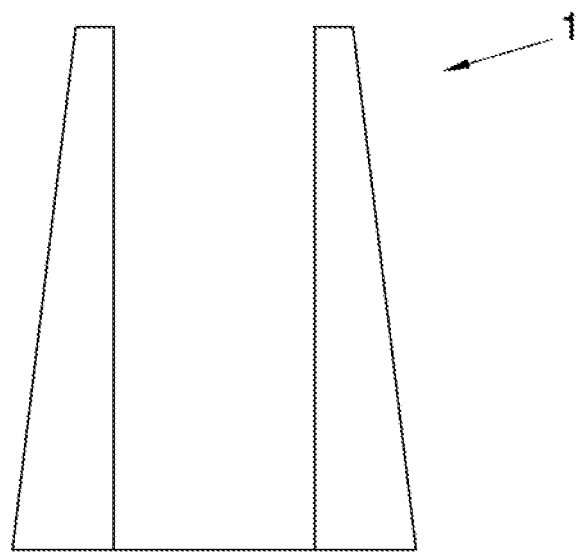
FIGS. 1A and 1B show, respectively, a plan and an elevational view of a section of the tower object in accordance with some of the embodiments of the present invention.
Figure 1B:
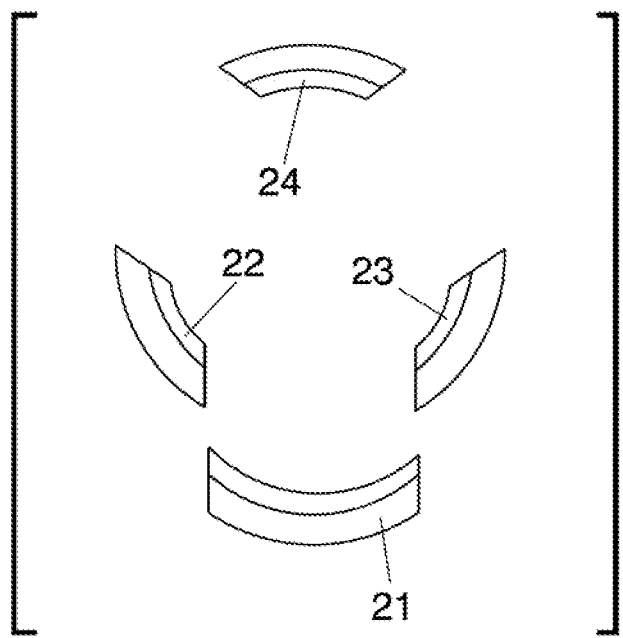

In the first example of embodiment of the invention, the tower (1) to be constructed is constituted by some modules (21, 22, 23, 24) of the same height which form each section of the tower (1) and which have two lateral sides which dispose of a longitudinal inclusion which define a space between adjoining lateral sides, an upper side and a lower side. In this embodiment, a first module (21) is placed between a second (22) and a third module (23), as observed in FIG. 1, of the same height where some lateral sides of the second (22) and third module (23), adjacent to the first module (21), are parallel to each other; such that the first module (21) can position itself in its final position, using an essentially vertical or even totally vertical movement.

In this first embodiment of the invention, at least one lateral side of the second (22) and third module (23) and the lateral sides of the first module (21) incorporate guiding means (3) which are represented schematically in FIG. 4 and which consist of some projections (5) which enter in some guides or vertical slots (4). The projections (5) can be on the lateral side of the first module (21) and the guides (4) on the corresponding lateral sides of the second (22) and third module (23) or vice versa. In one embodiment, the guides have on its upper part a wedge shape, facilitating the insertion of the projections (5) into the corresponding guides.

Said guiding means cooperate with each other in the insertion movement of the first module (21) between the second (22) and the third (23), as such guiding the first module (21) along its trajectory and being simple to position said module into its final correct position, allowing in this way to continue the construction of the tower using the insertion of modules. Logically the disposition can also be done inversely, i.e., providing the second (22) and the third module (23) with projections (5) and having guiding slots in the first module (21).

Figure 2A:
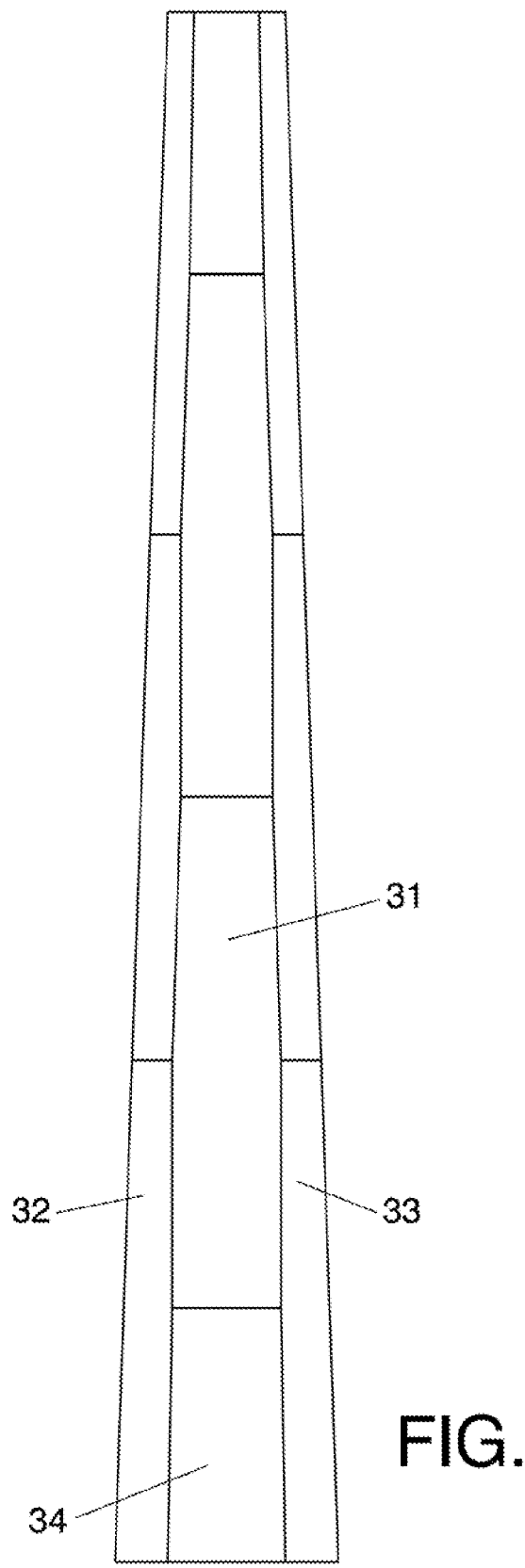
FIGS. 2A, 2B, and 2C show, respectively an elevational view, a perspective, and a plan view of a tower object in accordance with some embodiments of the present invention.
Figure 2B:
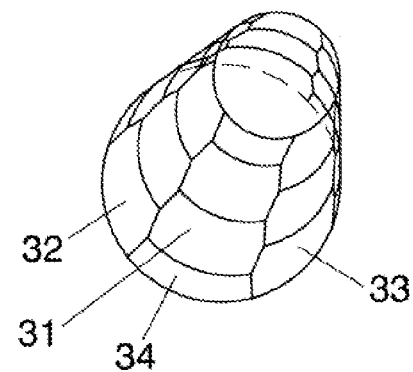
Figure 2C:
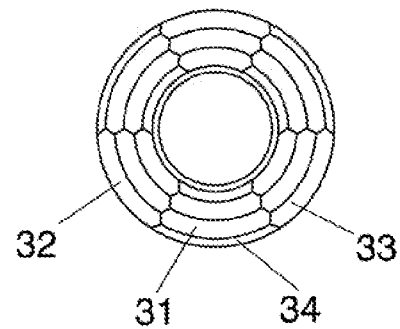

In an alternative embodiment of the tower (2), shown in FIG. 2, the modules which have two lateral sides, an upper side and a lower side which compose the inferior section of the tower have different heights, with a fourth module (34) between a second (32) and a third module (33) of greater height and positioning a first module (31) on the fourth (34) and between the second (32) and the third (33). In FIG. 3, additional detail is shown of the lower section of said tower (2).

The lateral sides of the second (32) and third modules (33) higher, at least in the part which protrudes with respect to the fourth module (34), are parallel to each other so that the first module (31) can be positioned on the fourth module (34) using a total or partially vertical movement. The lateral sides of the second (32) and third module (33) have two parts at an angle, as such the perimeter of the exterior adopts an approximately irregular hexagonal polygonal shape as observed in FIGS. 2 and 3.

In this alternative embodiment, the lateral sides of the second (32), third (33) and fourth module (34) incorporate guiding means (3) which cooperate with each other in the insertion movement of the first module (31) between the second (32) and third (33). As with the previous embodiment the guiding means consist of guides (4) on the upper lateral sides of the second (32) and third modules (33) and some projections (5) on the lower lateral sides of the first module (31). The projections (5) enter the guide (4), guided as such to the third module (23) on its trajectory and it being simple to position said module (2) in its final correct position. Moreover, as with the previous embodiment, the guides (4) can have a wedge form to facilitate insertion of the corresponding projections (5).

In both embodiments, the assembly procedure is identical, in that the assembly of the tower is carried out by raising module by module. The external surface of the modules disposes of grooves to house some tensioning cables (7). The first module (21, 31), once positioned, is provisionally fixed in position thanks to the guiding means (3), when inserting the projections (5) in the guides (4) avoiding the need for additional fixing elements until the setting of definitive vertical joints.

Figure 5:
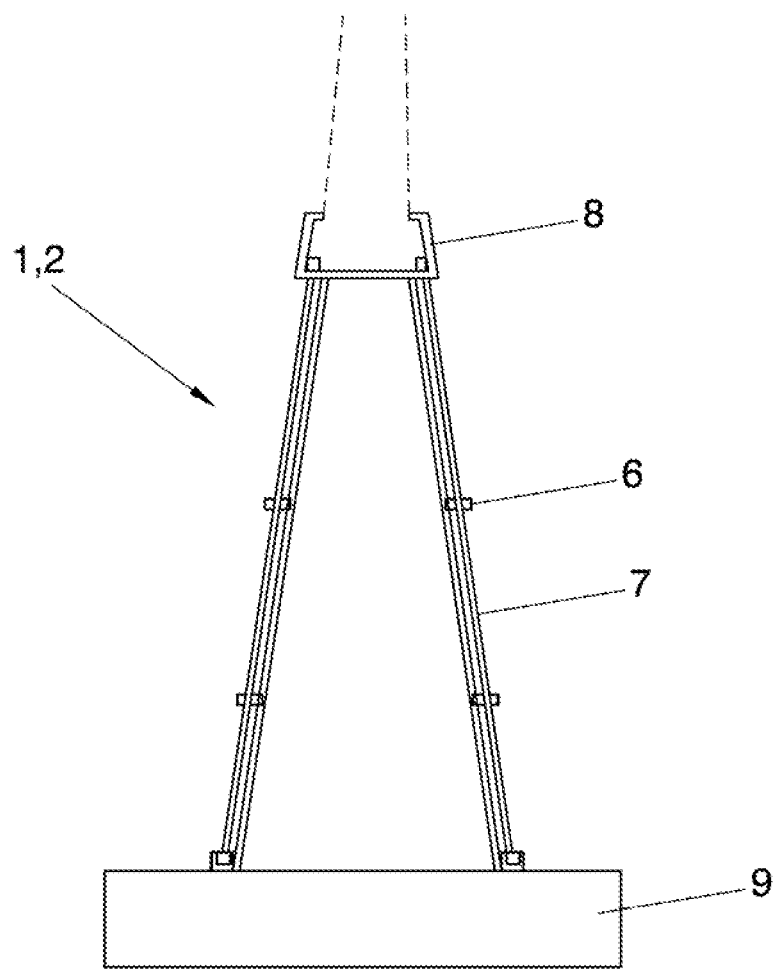
FIG. 5 shows an arrangement of the tensioning cables.

As shown in FIG. 5, once assembled, the modules it is proceeded to carry out tensioning of the tower using tensioning cables (7) which run along the aforementioned grooves on the exterior of the external face of the tower; the tensioning cables (7) are fixed to the wall of the tower at intermediate points using anchors (6) and, at their extremes, to a mast (8) which acts as interface and to a foundation (9). Likewise on said mast (8), a gondola is directly fixed, or one or various metallic sections on which the gondola will be installed.

As in any reinforced concrete tower construction which uses modules or segments to erect the same, the design and undertaking of vertical joints is a key element in a reinforced concrete tower constructed by piling sections formed of adjacent modules.

In a preferred embodiment, to construct the tower (1, 2) object of the present invention, damp vertical and/or horizontal joints are used, being executed using the pouring or injection of mortar or grout. Given that the temperature conditions both the handling of the mortar and the resistance achieved once hardened, and taking into account that it is common to have wind turbines in extreme climates, the process of setting the joints comprises the step of thermally conditioning the mortar or the grout. In this way, when the assembly of the tower is carried out at an extreme ambient temperature, be it extreme cold or heat, the temperature of the mortar or grout is conditioned so that there is a thermal gradient with respect to the temperature of the reinforced concrete module. The optimal temperature of the filling is commonly comprised of between about 15° C. and about 25° C., typically being about 20° C. When the ambient temperature is 40° C. the mortar or grout is cooled to 5° C., so that once the joint is filled it reaches the optimal temperature. On the other hand, if the temperature is −5° C., the mortar or grout is heated for example to 35° C. so that the hardening begins at a temperature close to the optimal temperature.

Finally the vertical sides of the modules (21, 22, 23, 24, 31, 32, 33, 34) are equipped with elastic elements (40, 41) so that, once modules (21, 22, 23, 24, 31, 32, 33, 34) are inserted between each other said elastic elements seal the space between them. The aforementioned guiding means (3) allow the insertion of the modules (21, 22, 23, 24, 31, 32, 33, 34) without damaging the elastic elements (40, 41) on the sides; thanks to which it is not necessary to position shuttering during the execution of damp vertical joints.

In another embodiment of the invention the elastic elements (40, 41) are tubes which can expand using the backfilling with a fluid as such guaranteeing the correct sealing of the joint, said fluid can be air for example.

Figure 6:
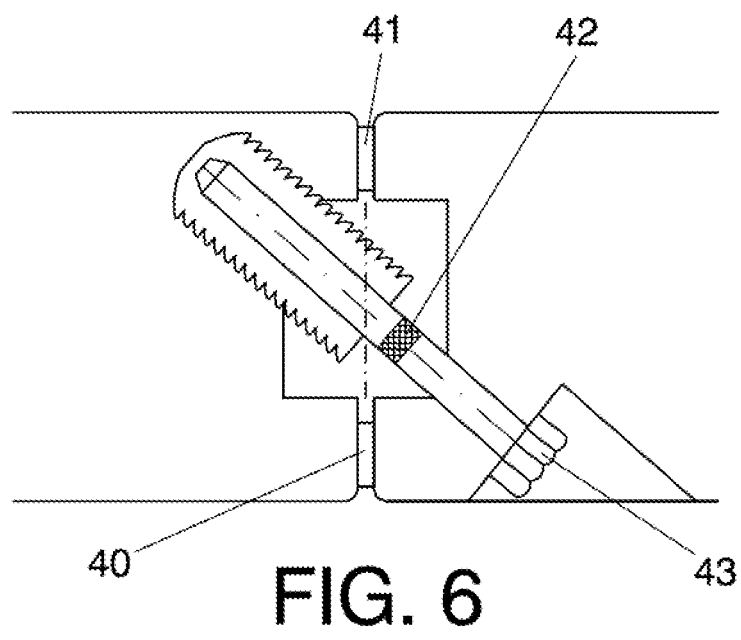
FIG. 6 shows a section of the joining of the joints using bolts.

In another embodiment of the invention the vertical joints also comprise of bolts (43) as those which can be appreciated in FIG. 6 which cross the lateral side of one of the modules (21, 22, 23, 24, 31, 32, 33, 34) and thread onto the lateral side of one of the adjoining modules (21, 22, 23, 24, 31, 32, 33, 34), passing the vertical joint which is carried out once the space is idled between adjacent longitudinal inclusions of adjoining modules (21, 22, 23, 24, 31, 32, 33, 34) with mortar or grout. Said bolts (43), in the area that is subsequently filled with mortar or grout, has part of its section which is non circular (42). When the filling hardens, thanks to the said non circular part (42), the bolt blocks impeding it from turning. As such, the join described does not need maintenance.

In another embodiment, in the case of the damp horizontal joints, adjustable stoppers are used between the first module (21, 31) and one of the modules (22, 23, 24, 32, 33, 34) upon which it is supported. Said stoppers support the weight of the first module (21, 31) and are used to level the first module 31) and adjust the space in which the horizontal joint is set. Said stoppers are removed once the joint is set, and then support all the weight of the first module (21, 31) on the joint.

In a preferred embodiment of the tower (1, 2), it has a substantially truncated conical shape, corresponding the exterior surface with a surface of revolution, the result of turning a straight or curved line with respect to an axis.

Accordingly, a wind generator tower and process for assembly thereof are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A wind turbine tower defined by a surface of revolution, the wind turbine tower being tapered upwardly and comprising:
   at least one annular section composed of at least four modules that join together to form the at least one annular section, wherein the at least four modules respectively dispose of an upper horizontal side, a lower horizontal side and a first lateral side and a second lateral side, each side comprising a beginning endpoint and an ending endpoint, wherein for at least two of the modules of the at least one annular section:
      at least a portion of the first lateral side and at least an opposing portion of the second lateral side are parallel and directly adjacent to the lower horizontal side, and the upper horizontal side is shorter than the lower horizontal side.

2. The wind turbine tower according to claim 1, further comprising guiding means which are located on the lateral sides of the modules.

3. The wind turbine tower according to claim 2, further comprising horizontal joints set by pouring a filler into horizontal spaces and vertical joints set by pouring a filler into the vertical spaces, wherein the guiding means are additionally adapted to act as provisional fixing means of the modules until the setting of the vertical and horizontal joints.

4. The wind turbine tower according to claim 3, wherein the guiding means comprise of at least one projection destined to fit in a guide located respectively in the lateral sides of the modules.

5. The wind turbine tower according to claim 1, wherein each annular section defines horizontal spaces with each one of the adjacent annular sections, the wind turbine tower further comprising horizontal joints set by pouring a filler into the horizontal spaces.

6. The wind turbine tower according to claim 1, wherein each module comprises longitudinal inclusions defined in the lateral sides which delimit vertical spaces between adjacent modules, the wind turbine tower further comprising vertical joints set by pouring a filler into the vertical spaces.

7. The wind turbine tower according to claim 6, wherein the lateral sides further comprise elastic elements designated to seal a defined space between the adjacent modules.

8. The wind turbine tower according to claim 1, wherein the modules are positioned in a stepped way with a first module located at a greater height than a second module and a third module.

9. The wind turbine tower according to claim 8, wherein each of the lateral sides of the second module and the third module comprise two surfaces that form an angle between them of less than about 180°.

10. The wind turbine tower according to claim 1, further comprising joints between lateral sides wherein the joints further comprise bolts which cross at least one of the modules and are threaded onto one of the modules adjacent to the first.

11. The wind turbine tower according to claim 10, wherein the bolts comprise an intermediate part with a non-circular section.

12. The wind turbine tower according to claim 1, further comprising tensioning cables which are anchored at their lower part to a foundation close to the base of the tower and at their upper part to a mast running along the exterior surface of the modules.

13. The wind turbine tower according to claim 12, wherein the modules further comprise grooves on their exterior surface arranged to house the tensioning cables.

14. The wind turbine tower according to claim 12, wherein the tensioning cables are fixed to intermediate positions on the tower using anchors.

15. The wind turbine tower according to claim 1, wherein the two lateral sides adjacent to the lower horizontal side of at least one of the modules are comprised on a vertical plane.

16. The wind turbine tower according to claim 1, wherein the modules further comprise two upper lateral sides, each one of them adjacent to one lateral side.

17. A method for assembling a wind turbine tower, the tower being tapered upwardly, the method comprising:
   providing at least one annular section composed of at least four modules that join together to form the at least one annular section, wherein the at least four modules respectively dispose of an upper horizontal side, a lower horizontal side and a first lateral side and a second lateral side, wherein for at least two of the modules of the at least one annular section:
      at least a portion of the first lateral side and at least an opposing portion of the second lateral side are parallel and directly adjacent to the lower horizontal side, and the upper horizontal side is shorter than the lower horizontal side; and
   inserting, using a guiding means incorporated in the vertical sides of the modules, a first module by a movement at least partially vertical between a second module and a third module.

18. The method of claim 17, further comprising:
   thermally conditioning a filler;
   the vertical part of at least one of the two lateral sides creating a vertical space; and
   filling the vertical space with the conditioned filler.

19. The method of claim 18, wherein the thermal conditioning of the filler comprises heating the filler above an optimal temperature if an ambient temperature is less than the optimal temperature or cooling the filler below the optimal temperature if the ambient temperature is greater than the optimal temperature, the optimal temperature being between about 15° C. and about 25° C.

20. The method of claim 17, further comprising joining the joints using joining bolts before filling the joints.

* * * * *